(12) United States Patent
Iraschko (10) Patent No.: US 8,172,047 B2
(45) Date of Patent: May 8, 2012

(54) COMPACT COMBINATION BRAKE CYLINDER COMPRISING A PNEUMATIC LOCKING MECHANISM

(75) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/211,348

(22) Filed: Aug. 17, 2011

(65) Prior Publication Data

US 2011/0297492 A1 Dec. 8, 2011

Related U.S. Application Data

(60) Division of application No. 12/567,043, filed on Sep. 25, 2009, now abandoned, which is a continuation of application No. PCT/EP2008/002367, filed on Mar. 26, 2008.

(30) Foreign Application Priority Data

Mar. 27, 2007 (DE) .......................... 10 2007 015 209

(51) Int. Cl.
*F16D 65/24* (2006.01)
(52) U.S. Cl. ........................... 188/170; 188/265; 303/89
(58) Field of Classification Search ............. 188/153 R, 188/153 D, 265, 170, 70 R; 303/89; 192/38, 192/66.2
See application file for complete search history.

(56) References Cited

U.S. PATENT DOCUMENTS 3,636,822 A 1/1972 Horowitz
3,762,519 A * 10/1973 Bentley .................... 192/105 BB
3,994,206 A 11/1976 Dahlkvist et al.
4,472,995 A 9/1984 Persson
(Continued)

FOREIGN PATENT DOCUMENTS

DE 199 33 165 A1 1/2001
DE 10 2005 044 708 A1 4/2006

OTHER PUBLICATIONS

German Office Action dated Jan. 10, 2008 including English translation (6 pages).

(Continued)

*Primary Examiner* — Bradley King
(74) *Attorney, Agent, or Firm* — Crowell & Moring LLP (57) ABSTRACT

A brake cylinder for pneumatic vehicle brakes, especially for utility vehicles includes a spring brake section for carrying out parking brake actions by way of a brake spring, and a service brake section for carrying out pneumatic service brake actions. The spring brake section and the service brake section are combined in one housing as a structural unit. The housing is subdivided by a piston into two compartments, one compartment of the two being used as the pressure compartment for actuating the service brake section, and the brake spring of the spring section being arranged in the other compartment on the opposite end of the piston. The brake spring acts upon an additional spring piston in the compartment, which can be locked relative to the piston by a pneumatic locking mechanism and can be released therefrom by releasing the locking mechanism. The spring piston is connected to a piston rod directly or via additional elements to actuate the vehicle brake. Once the locking mechanism is released, the brake spring is effective between the two pistons and displaces them relative to each other during a parking brake action. The locking mechanism is configured as a pneumatic coupling.

4 Claims, 6 Drawing Sheets

U.S. PATENT DOCUMENTS

| | | | |
|---|---|---|---|
| 4,478,319 A | 10/1984 | Casalone et al. | |
| 7,523,813 B2 * | 4/2009 | Fuderer et al. | 188/71.8 |
| 7,523,999 B2 | 4/2009 | Iraschko | |
| 7,987,953 B2 * | 8/2011 | Iraschko | 188/170 |

OTHER PUBLICATIONS

International Search Report dated Nov. 10, 2008 including English translation (4 pages).

* cited by examiner

COMPACT COMBINATION BRAKE CYLINDER COMPRISING A PNEUMATIC LOCKING MECHANISM

CROSS-REFERENCE TO RELATED APPLICATIONS

This application is a divisional application of U.S. application Ser. No. 12/567,043, filed Sep. 25, 2009, which is a continuation of PCT International Application No. PCT/EP2008/002367, filed Mar. 26, 2008, which claims priority under 35 U.S.C. §119 to German Patent Application No. DE 10 2007 015 209.6, filed Mar. 27, 2007, the entire disclosures of which are herein expressly incorporated by reference.

This application contains subject matter related to U.S. application Ser. No. 12/566,980, entitled "Compact Combined Cylinder Comprising a Manual Release Device;" U.S. application Ser. No. 12/567,098, entitled "Compact Combination Cylinder for Vehicle Brakes, Comprising a Control Device, and Method for Controlling the Brake Cylinder;" U.S. application Ser. No. 12/567,080, entitled "Compact Combined Cylinder Comprising a Manual Release Device;" U.S. application Ser. No. 12/566,991, entitled "Brake Cylinder for a Pneumatically Operable Vehicle Brake" and U.S. application Ser. No. 12/567,085, entitled "Compact Combined Brake Cylinder," all filed on even date herewith.

BACKGROUND AND SUMMARY OF THE INVENTION

The invention relates to a brake cylinder for pneumatically actuated vehicle brakes, in particular for commercial vehicles.

In heavy commercial vehicles, the parking brake is actuated by what are known as spring force accumulator cylinders (spring-loaded cylinders). Here, the brake actuating force is generated via spring force, with the result that the requirements for a mechanically actuated parking brake are satisfied.

Since the spring force accumulator cylinders are, as a rule, designed to generate very high forces, manual release in the operating case is no longer appropriate. In the case of pneumatically actuated brakes, the parking brake is therefore released by means of compressed air.

In order to make this possible, spring force accumulator cylinders are, as a rule, equipped with a release piston. It is possible by way of this piston, if compressed air is introduced, to compress the spring to such an extent that the brake is released. In order that the parking brake is not engaged while driving, the piston is loaded constantly with compressed air, with the result that the spring cannot be relieved and therefore the parking brake does not start to act.

The most common design is what is known as a combined cylinder. A combined cylinder includes or combines two different brake cylinder types, namely a spring force accumulator cylinder for the parking brake system (PBS) and a compressed air cylinder (usually a diaphragm cylinder) for the service brake system (SBS).

The two cylinders are usually arranged behind one another in an axial direction. The spring force accumulator part, which acts with its piston rod on the piston collar of the diaphragm cylinder and by the latter, in turn, on the brake lever, is arranged behind the diaphragm part of the combined cylinder.

This design requires a relatively large amount of installation space. However, the installation space is being limited increasingly by the introduction of more complex chassis systems, such as independent suspension systems, lightweight axles, etc.

There are therefore efforts to minimize the space requirement for the parking brake cylinder by other designs and methods of operation. To this extent, what is known as a compact combined cylinder affords a more compact design. DE 10 2005 044 708 A1 (corresponding to U.S. Pat. No. 7,523,999 B2) discloses a brake cylinder of this type, in which the function of the parking brake cylinder is integrated directly into the service brake cylinder. Here, the spring force accumulator spring is no longer actuated via a separate spring force accumulator piston, but rather likewise via the piston of the service brake cylinder. In order to release the parking brake, the SBS piston is loaded for a short time period by way of a special actuation with compressed air. Since the piston force which is produced here is greater than the maximum compressive force of the accumulator spring, the latter is compressed. Subsequently, the spring is arrested by way of a pneumatically actuated locking mechanism, and subsequently the cylinder piston is ventilated. The cylinder piston can then be moved with the compressed and arrested accumulator spring into the rest position by the piston restoring spring.

The parking brake is engaged by the ventilation of the pneumatically actuable locking mechanism of the spring force accumulator spring. The locking mechanism realizes a very important functional unit for the overall function of the compact combined cylinder. High requirements are therefore made of the functional response and the reliability of this component.

The mechanism can be realized in different ways. One possibility includes arresting the spring via a threaded spindle, which is not self-locking. To this end, it is required to arrest the threaded spindle by a pneumatically switchable clamping mechanism or locking mechanism.

It is therefore the object of the invention to provide a brake cylinder of the generic type with a clamping mechanism, which is functionally reliable and can nevertheless be realized with manageable structural expenditure.

The invention achieves this object by a brake cylinder for pneumatically actuated vehicle brakes, in particular for commercial vehicles, having a spring force accumulator brake section for carrying out parking brake operations by way of a spring force accumulator spring, and a service brake section for carrying out service brake operations, which are actuated by compressed air. The spring force accumulator brake section and the service brake section are combined in a housing to form one structural unit. The housing is divided by a piston into two spaces, of which one of the two spaces serves as pressure space for actuating the service brake section. The spring force accumulator spring of the spring force accumulator section is arranged in the further space on the opposite side of the piston. The spring force accumulator spring acts in the space on a further spring force accumulator piston, which can be locked with respect to the piston by way of a pneumatically actuable locking mechanism and can be released from the locking mechanism by release of the latter, and which is connected directly or via further elements to a piston rod for actuating the vehicle brake. After the release of the locking mechanism, the spring force accumulator spring acts between the two pistons and displaces them relative to one another in the case of a parking brake operation. The locking mechanism is designed as a pneumatically actuable clutch.

Advantageous refinements of the invention are described herein.

In order to arrest or to release the threaded spindle, the pneumatically actuated clutch is advantageous. In clutches, there are in principle two different action principles, firstly what are known as the friction clutches and secondly what are known as the claw clutches. Both variants are used.

The invention realizes a brake cylinder having a clamping mechanism which is of simple construction, can be produced simply and affords a reliable clamping action in all possible operating conditions. To be highlighted here are firstly the high immunity to vibrations, the satisfactory and reproducible release behavior, the high fatigue resistance and the high wear resistance, and secondly the small installation space requirement of the construction.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
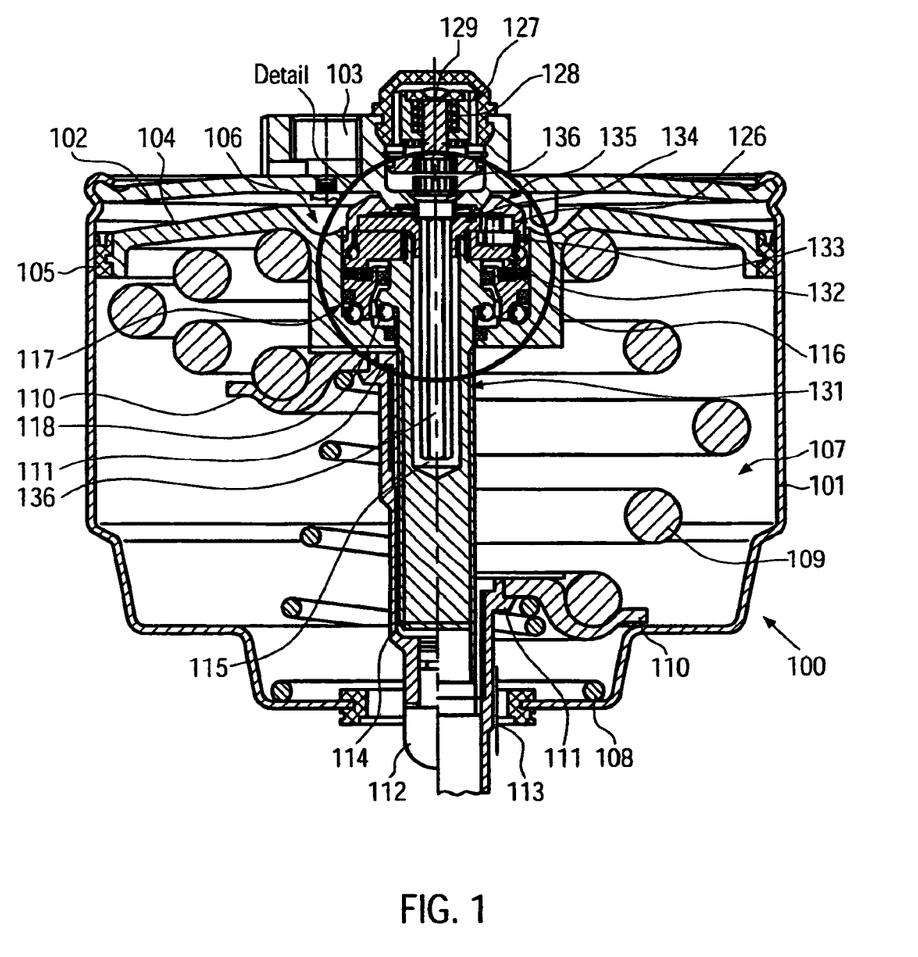
FIG. 1 is a cross-sectional view of a compact combined brake cylinder, in the release position (left side) and in the parking brake position (right side)

FIG. 1 shows a section through a compact combined brake cylinder 100 according to an embodiment of the invention, the spring force accumulator being shown in the released position in the left half of the drawing and the spring force accumulator being shown in the engaged position in the right half of the drawing.

Figure 2:
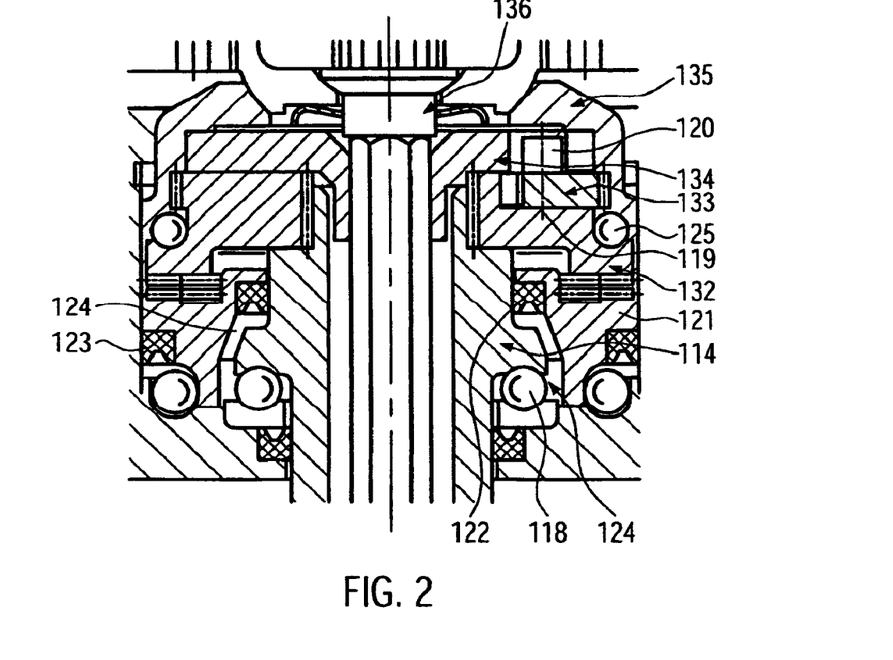
FIG. 2 shows a detailed view from FIG. 1.
Figure 3:
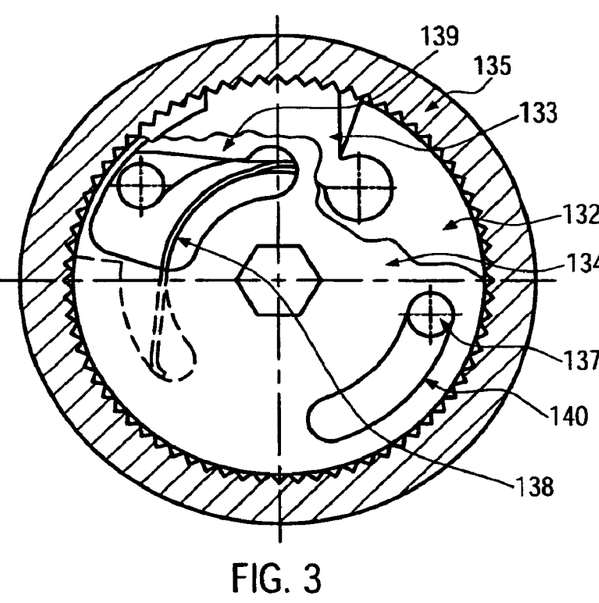
FIGS. 3 to 6 are partly cut-away illustrations of elements of a manually actuable release device of the compact combined brake cylinder from FIGS. 1 and 2 in different operating states.

The brake cylinder 100, which is shown in FIGS. 1 to 3, has a housing 101 which is cup-shaped and preferably substantially cylindrical. The housing 101 is closed at one of its ends by a cover 102, which is provided with at least one or more compressed air connections 103. A piston 104 having a piston sealing ring 105 is arranged in the cup-shaped housing 101, the diameter of the piston 104 together with the piston sealing ring 105 corresponding to the internal diameter of the housing 101. The piston 104 can be loaded through the compressed air, connection 103 with compressed air which can also flow out through the connection.

As FIG. 1 shows, the piston 104 is countersunk in its central region, with the result that a pressure space 106 is produced. A further space 107 is delimited by the piston 104, into which further space 107 a conical return spring 108 and a spring force accumulator spring 109 are inserted. The spring force accumulator spring 109 is placed between the piston 104 and a spring force accumulator piston 110, the diameter of which is smaller than the internal diameter of the housing. The return spring 108 is placed between the side of the spring force accumulator piston 110 which faces away from the spring force accumulator and the inner end region of the housing 101 which faces away from the cover 102.

On its internal circumference, the spring force accumulator piston 110 rests on a collar 111 of a piston rod 112. The piston rod 112 penetrates an opening 113, which is formed in the housing 101 on the end of the housing 101 facing away from the cover 102. The piston rod 112 serves to actuate an application apparatus of a brake.

A pneumatically actuable locking mechanism 116 is accommodated in a central receiving space 117 of the piston 104 on that side of the piston 104 which faces the cover 102. The piston 104 receives the locking mechanism 116.

The piston rod 112 is of sleeve-shaped design and is provided with an internal thread, into which a threaded spindle 114 (provided with an external thread) engages. The threaded spindle 114 is not of a self-locking design. It is preferably coupled at one of its ends directly or via intermediate elements to the pneumatically actuable locking mechanism 116, which is configured here in the form of a pneumatically actuable clutch. In the exemplary embodiment which is shown, the locking mechanism is configured as a positively engaging clutch 116.

Here, the clutch 116 is formed in an advantageous and compact way between a locking mechanism piston 121 and the axial faces of a bearing plate 132 (explained below) and is coupled to the threaded spindle 114 in a rotationally fixed manner.

On its internal and its external circumference, the locking mechanism piston 121 is sealed by way of piston ring seals 122, 123 with respect to the threaded spindle 114 and the receiving space 117.

The locking mechanism piston 121 can be loaded with compressed air via a pressure space 124 and via a compressed air line (in a manner which is not shown here), as a result of which the clutch 116 can be brought into engagement. The threaded spindle 114 is correspondingly prevented from rotating by loading the pressure space 124 below the locking mechanism piston 121 with compressed air, with the result that the PBS brake can be set out of operation. The threaded spindle 114 is supported on the piston 104 via rolling bodies 118.

In the position on the left of FIG. 1, the clutch 116 is closed and the pneumatically actuable locking mechanism is activated, with the result that the threaded spindle 114 is secured against rotating.

If the spring force accumulator piston 110 is then to be transferred into the parking brake position, which is shown in the illustration on the right of FIG. 1, the force which is guided into the clutch 116 from the locking mechanism piston 121 is reduced by a pressure drop in the space 124, with the result that the force which is applied by the spring force accumulator spring 109 brings about a situation where the threaded spindle 114 rotates, the spring force accumulator piston 110 being displaced with the piston rod 112 in the braking position.

The rotational speed can be regulated by the brake force of the clutch 116, with the result that the linear movement of the spring force accumulator piston 110 can also be controlled.

In order to release the braking position, the pressure space 106 is loaded with pressure in accordance with the preceding embodiment. Since the parking brake piston 121 is now pressureless, the threaded spindle 114 can be rotated and the spring force accumulator piston 110 is moved back into the initial position counter to the action of the spring force accumulator spring 109.

In the case of service brake operations, the clutch 116 remains in the braking position, with the result that the two pistons 104, 110 are moved jointly into the braking position, without changing their relative position with respect to one another. The action of the spring force accumulator spring 109 cannot be developed in this state. An analogous situation is valid for the release of the brake after service brake operations.

In the case of the compact combined cylinder 100, the function of the parking brake cylinder is integrated into the service brake cylinder. Here, the spring force accumulator spring 109 is no longer actuated via a separate spring force accumulator piston, but rather via the piston 104 of the service brake cylinder. In order to release the parking brake, the SBS piston is loaded for a short time period by means of a special actuation with compressed air.

As described in the preceding text, the parking brake or the parking brake section is released as a rule with the aid of compressed air. In addition, however, it is also possible according to the invention to release the parking brake section manually by way of a manually actuable release device in the case of a pressure loss. To this end, in the case of conventional combined cylinders, the spring is pulled back with the aid of a threaded spindle (of what is known as the release spindle). The function of the service brake cylinder is not impaired as a result.

In the case of the compact combined cylinder, this cannot be realized in such a simple way, since the SBS piston and the spring force accumulator spring are connected to one another. If the spring force accumulator spring 109 were pulled back by a threaded spindle which is accessible from the outside, the SBS piston would also be blocked and, as a consequence, there would also no longer be the function of the SBS cylinder.

A manually actuable release device is therefore advantageous for manually releasing the spring force accumulator spring, which manually actuable release device makes it possible to cancel the spring force accumulator action in the case of pressure loss, without impairing the SBS function. Furthermore, it is to be possible to reestablish the PBS action after the release operation by a manual operation. This is achieved by the fact that the manually actuable release device is assigned a likewise manually actuable locking apparatus. The locking apparatus, which is shown in the drawings and will be described in greater detail is based on a ratchet mechanism.

The ratchet mechanism has a bearing plate 132, which is coupled in a rotationally fixed manner to the threaded spindle 114 or is integrally configured with the latter. The threaded spindle 114 is supported on a cup disk 135 by way of rolling bodies 125 and can be rotated relative to the locking apparatus depending on the functional position of the latter which acts between these two elements 132, 135. The bearing plate 132 has a recess 119 for a locking pawl 133 and a peg 137, which serves for torque transmission. The locking pawl 133 is inserted rotatably into the bearing plate 132, is connected to the disk cam 134 by an integrally formed pin 120 and is pressed radially to the outside by a leaf spring 138.

Furthermore, the ratchet mechanism includes a disk cam 134 with a control contour 139, an arcuate slot 140 and a centrally arranged hexagonal aperture. The control contour 139 serves for switching the locking pawl 133 on and off. In contrast, the arcuate slot 140 serves, above a defined angular travel, to transmit the torque to the bearing plate 132. The hexagon socket serves to introduce the torque into the disk cam 134. A profiled actuating mandrel 136 serves to introduce the manually applied torque. Furthermore, it serves to switch the mechanism on and off. The actuating mandrel 136 is mounted rotatably and pivotably in the housing 101 of the brake cylinder.

Furthermore, the ratchet mechanism includes the cup disk 135 having an internal toothing system, which is in engagement with the locking pawl 133 having a corresponding toothing system in the case of the manual release operation. The cup disk 135 is supported on the piston 104 and cannot be rotated relative to the latter. Since it is a positively engaging ratchet mechanism, reliable and slip-free locking of the spring force accumulator spring is ensured. The function of this arrangement is as follows. In the case of the manual release of the spring force accumulator spring 109, the threaded spindle 114 has to be turned back with the aid of a wrench. Here, the torque is transmitted via the actuating mandrel 136 into the disk cam 134. As a result of the rotation of the disk cam 134 relative to the bearing plate 132, the locking pawl 133 is released by the control contour 139 for engagement into the toothing system of the cup disk 135. Here, the locking pawl 133 is pressed elastically by the leaf spring 138 against the internal toothing system of the rotationally fixed cup disk 135. At the same time, after rotating past the control angle, the torque is transmitted via the arcuate slot 140 and a corresponding peg 137 in the bearing plate 132, from the disk cam 134 into the bearing plate 132 and from there into the threaded spindle 114.

Since, on account of the direction-dependent locking action, the locking pawl 133 prevents automatic turning back of the threaded spindle 114, the wrench can be turned without the threaded spindle 114 being turned back. This operation can be repeated until the spring force accumulator spring has reached the release position for the parking brake.

If the spring force accumulator spring is to be moved from the position "spring force accumulator released" manually into the position "spring force accumulator engaged", a rotational movement in the locking direction of the ratchet mechanism has to be carried out by way of the wrench. Here, first of all, the disk cam 134 is rotated relative to the bearing plate 132 until the locking pawl 133 is pulled out of the internal toothing system of the cup disk 135 by the control contour 139. As soon as this state is reached, the threaded spindle 114 can be rotated.

Figure 5:
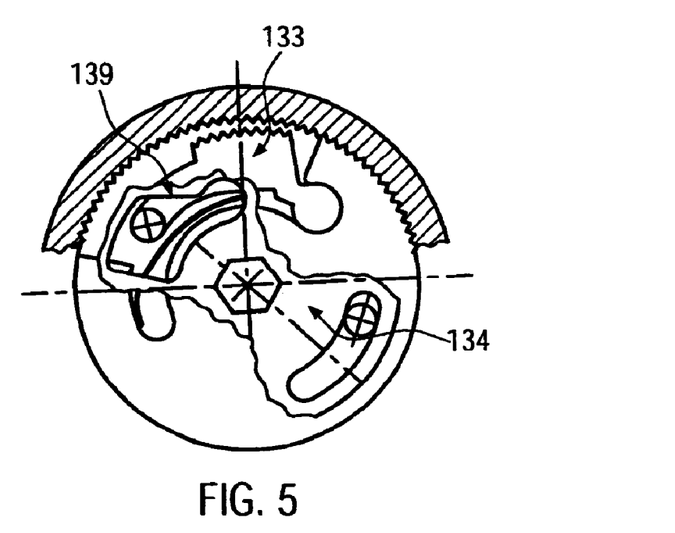

FIG. 5 shows a manual application of this type of the spring force accumulator brake. In this figure, the disk cam 134 is rotated to the left, as a result of which the locking pawl 133 is pulled out of the toothing system via the contour 139. As a result, the bearing plate 132 can be rotated as far as the next latching of the locking pawl 133.

Since the threaded spindle 114 moves more quickly than the disk cam 134 which is guided by the wrench, a relative movement occurs between the bearing plate 132 and the disk cam 134 and, as a consequence, the locking pawl 133 latches again in the internal toothing system of the rotationally fixed cup disk 135. This ensures that the threaded spindle 114 is rotated only so far and as quickly as is predefined by the rotational movement of the wrench.

To this end, it is necessary to rotate the actuating mandrel 136 with the aid of a wrench in the direction of "engage spring force accumulator brake" until a further rotation is no longer possible. This achieves a situation where the disk cam 134 is rotated relative to the bearing plate 132 and the switching pin of the locking pawl 133 is moved into a latching position on the control contour 139.

Figure 6:
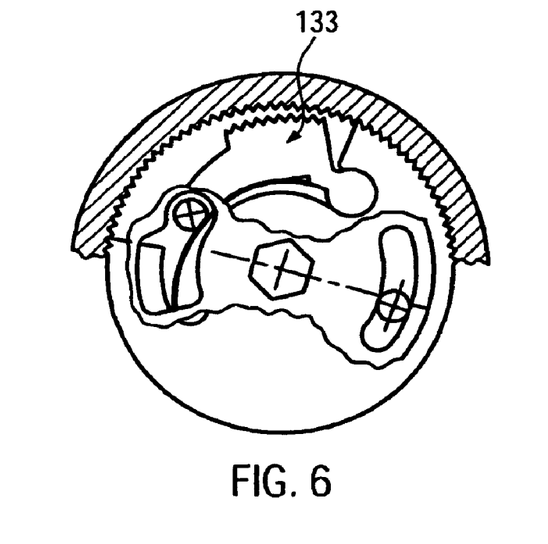

FIG. 6 shows the manual release device in its deactivated position. The locking pawl 133 remains in its rest position.

Figure 4:
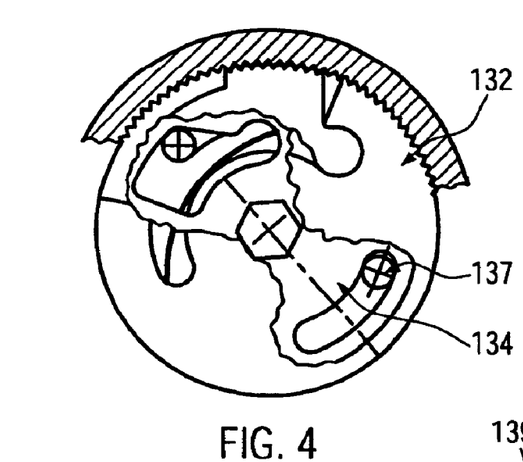

FIG. 4 shows the locking position of the free wheel. The bearing plate 132 is rotated to the right by the disk cam 134 via the pin 137. The bearing plate 132 cannot rotate automatically to the left in this position.

As described in the preceding text, during the manual release operation of the spring force accumulator brake, the threaded spindle 114 is rotated with the aid of what is known as the actuating mandrel 136 and the ratchet mechanism 126 for pulling back the accumulator spring 109 by way of a wrench.

During the manual release operation, the actuating mandrel 136 is in contact with the manual rotating apparatus 127 for attaching an actuating tool, in particular a wrench. The rotating apparatus 127 is designed in such a way that, for example while being turned back, that is to say, releasing of the spring force accumulator, an outer sleeve 128 follows a travel (stroke) in the axial direction as a result of a special shape, until an introduction of torque is possible.

This axial stroke results in a graduation on the end side between the outer sleeve 128 and an inner pin 129. On account of this clear contour change, the manual release state of the spring force accumulator brake can be visually detected or sensed.

As explained inter alia in the preceding text, the pneumatically actuated clutch 116 is necessary, in order to arrest or to release the threaded spindle 114.

In the following text, advantageous refinements of the clutch 116 are to be presented.

Firstly friction clutches and secondly claw clutches, which operate in a positively locking manner, are suitable as the clutch 116. A friction clutch has the advantage of infinitely variable and meterable response or release behavior. However, the clutch force is influenced greatly by the level of the coefficient of friction. In order to ensure as constant as possible operating behavior, a stable level of the coefficient of friction is therefore required. In the case of the claw clutch, in contrast, the clutch force is influenced only unsubstantially by the friction. Main influencing variables are the shape (geometry) and the pressing force. A metering capability is scarcely possible, however.

Figure 7:
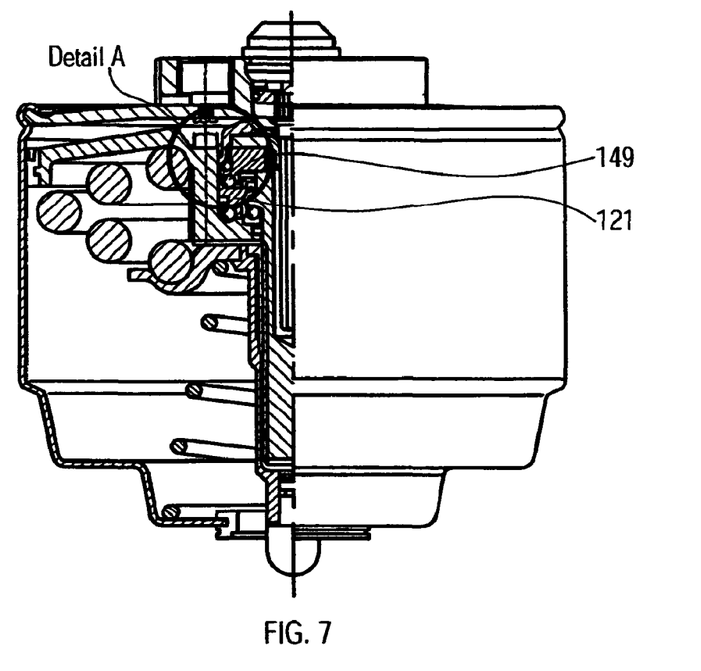
FIG. 7 is an illustration in half section of one variant of the compact combined brake cylinder from FIG. 1.
Figure 8:
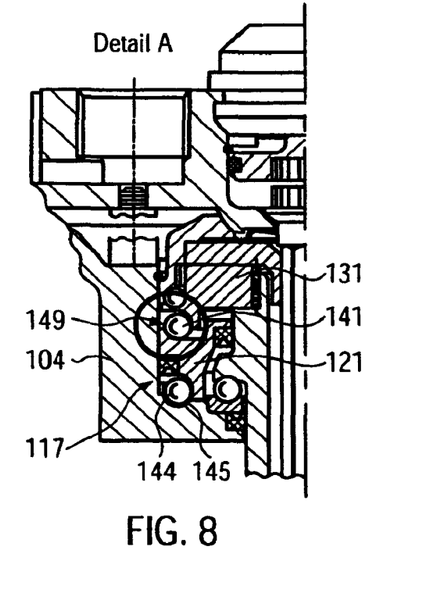
FIGS. 8-15 are detailed views of further compact combined brake cylinders according to the invention.

FIGS. 7 and 8 disclose a structural solution based on friction. In the practical case, there is the problem that the clutch force is relatively high in relation to the closing force. It is therefore necessary to increase the effective pressing force as a result of a boosting effect. This is achieved according to FIGS. 7 and 8 by way of a cone clutch 149. On account of the conical shape, as a function of the cone angle, the result is an increase in the pressing force and therefore a corresponding increase in the clutch force which can be transmitted.

Figure 9:
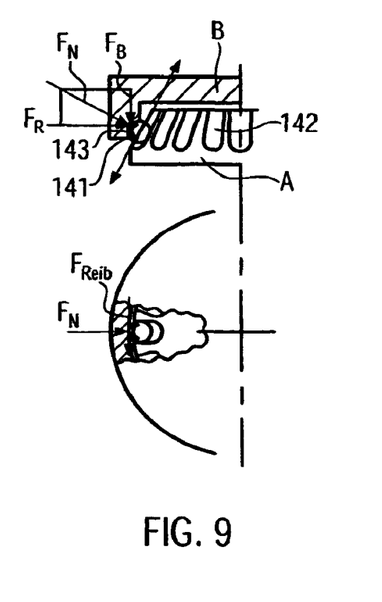

In the case of cone clutches with steep cone angles, there is the difficulty, however, that the satisfactory release of the clutch is no longer ensured. If a defined level of the coefficient of friction is exceeded, jamming of the clutch can occur. In order to avoid this, it is therefore required to keep the friction in the axial direction as low as possible and in the tangential direction as high as possible and stable in terms of the coefficient of friction as a result of structural measures. The structural embodiment which is shown in the following text meets these requirements (FIGS. 7, 8 and 9).

The basic concept here is adhesion or sliding friction in the circumferential direction and rolling friction in the axial direction. In order to achieve this, balls 141 (clamping ball) are used as transmission elements within the clutch 149. The clamping balls 141 lie in one clutch half A (FIG. 9) in what are known as clamping pockets 142. The clamping pockets 142 are designed in such a way that the balls 141 can roll unimpeded in the axial direction, but that in contrast no movement is possible in the tangential direction.

The cone angle is set by the inclination of the clamping pockets 142 for increasing the clamping force. In the other clutch half B (FIG. 9), the locking balls are pressed into a circumferential channel 143, which is adapted to the ball diameter, with the result that a friction is generated which is decisive for the clutch force.

This concept affords the following advantages:
very satisfactory release behavior of the clutch, since the balls 141 can roll in the axial direction;
lower influence of the lubricating state on the friction than in the case of conventional friction clutches, since the lubricating film is pressed away by the punctiform contact between the clamping balls and the corresponding face; and
simple manufacture of the components by way of forming technology without the removal of material.

FIG. 9 shows the functional principle, and FIGS. 7 and 8 show the use in the case of the compact combined cylinder, where the clutch halves A and B with the clamping pockets 142 and the channel 143 are formed, depending on the design, by the elements 121 and 131.

Figure 10:
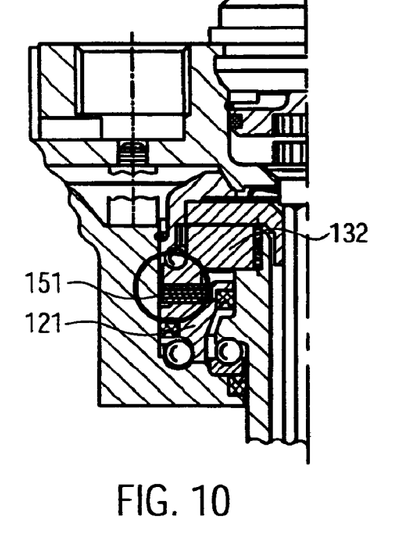

A further possibility for a friction clutch is what is known as the multiple disk clutch 151 of FIG. 10. This clutch type also affords the possibility of increasing the clutch force. The clutch force can be varied very simply here by the number of multiple disks. This clutch type affords the advantage of a compact design.

One exemplary embodiment is shown in FIG. 10 in conjunction with the compact combined cylinder.

As mentioned above, there is also the possibility of using a type of claw clutch 116. This clutch type affords the advantage that the friction plays only a very small role for the function. It is therefore ensured that the functional behavior is relatively insensitive to external influences such as lubricating state, temperature level and surface properties.

The level of the clutch force can be influenced very simply via the geometric shape. An advantage is also the favorable and easily reproducible release behavior, since adhesion friction effects can scarcely occur within the clutch.

Figure 11:
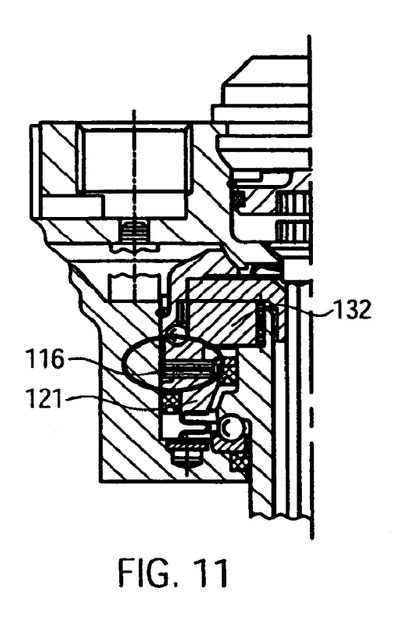
Figure 12:
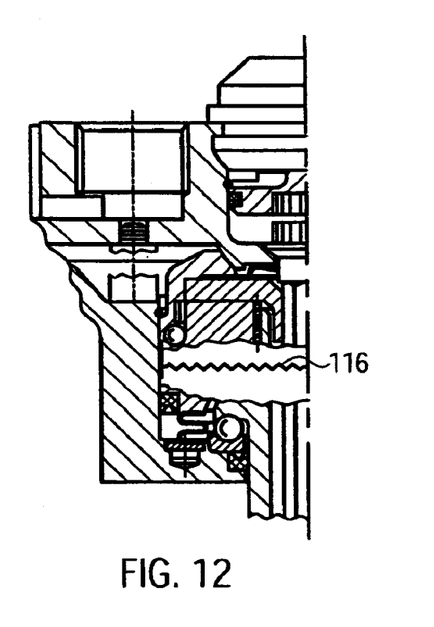

In a corresponding manner to FIG. 1, FIGS. 11 and 12 show the embodiment and the practical application case in a compact combined cylinder.

As has already been mentioned, the release behavior of the clutch plays an important role for the overall function of the compact combined cylinder. In order that satisfactory release behavior is achieved in the case of the clutch, it is also necessary that the actuating piston, which is loaded with compressed air, operates with a low functional hysteresis.

In the embodiment shown in FIG. 7, the piston 104 serves not only for the actuation of the locking clutch 116 but also for the transmission of the clutch moment. The locking mechanism piston 121 is therefore mounted displaceably in the piston 104 in a rotationally fixed manner. In order that the movement capability in the axial direction of the locking mechanism piston 121 is not impaired, a low-friction transmission of torque is required.

Figure 13:
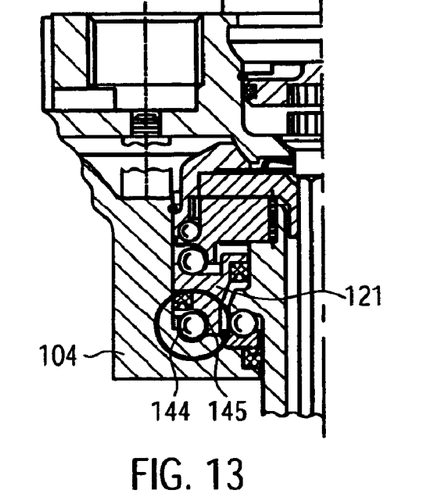
Figure 14A:
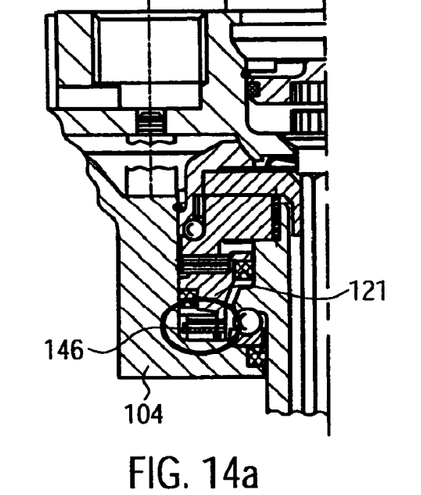
Figure 14B:
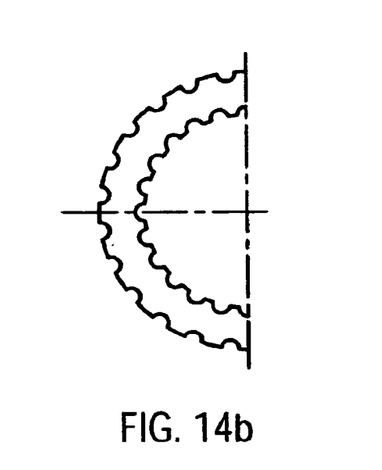
Figure 15:
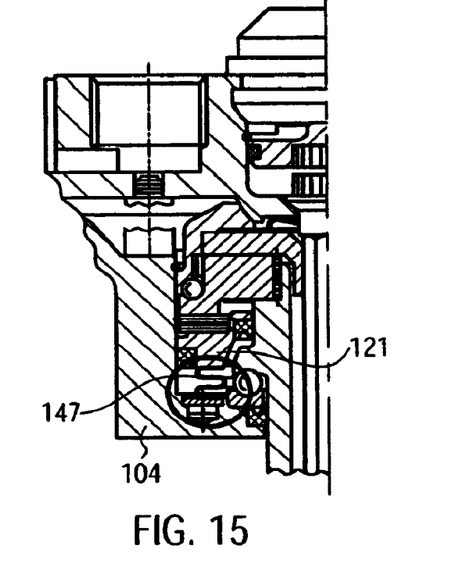

Different ways of coupling the locking mechanism piston 121 to the piston 104 are compiled in FIGS. 13 to 15, which ways meet this requirement.

In FIG. 13, balls 144 are used for the force transmission from the movable locking mechanism piston 121 to the fixed piston (housing) 104. Here, the balls 144 are embedded both in the locking mechanism piston 121 and in the surrounding piston 104, in its receiving space 117 in axially running grooves 145. This achieves a situation where, although the balls 144 and therefore the locking mechanism piston 121 can move axially with low friction, a transmission of force is possible in the circumferential direction.

Another possibility is provided by the coupling of the piston to the housing by a disk spring 146 (FIGS. 14a and 14b). On the outer circumference and in the bore, the disk spring has a profiling, into which the locking mechanism piston 121 or the piston 104 engages with a corresponding mating profile. It is thus possible to transmit circumferential forces, without the piston having to overcome substantial friction forces in the case of an axial movement. In the case of corresponding installation, the disk spring 146 can additionally also be used as a restoring spring for the piston 121.

Instead of the disk spring, a metal bellows 147 can also be used, which allows the spring force accumulator piston 121 to move axially with respect to the piston, but fixes it in its circumferential direction. The method of operation is thus as just described in the case of the disk spring.

| Table of Reference Numerals | |
|---|---|
| Compact brake cylinder | 100 |
| Housing | 101 |
| Cover | 102 |
| Compressed air connections | 103 |
| Piston | 104 |
| Circumferential sealing ring | 105 |
| Pressure space | 106 |
| Space | 107 |
| Return spring | 108 |
| Spring force accumulator spring | 109 |
| Spring force accumulator piston | 110 |
| Collar | 111 |
| Piston rod | 112 |
| Opening | 113 |
| Threaded spindle | 114 |
| Locking mechanism | 116 |
| Receiving space | 117 |
| Rolling bodies | 118 |
| Recess | 119 |
| Pin | 120 |
| Locking mechanism piston | 121 |
| Piston seals | 122, 123 |
| Pressure space | 124 |
| Rolling body | 125 |
| Ratchet mechanism | 126 |
| Rotating apparatus | 127 |
| Sleeve | 128 |
| Pin | 129 |
| Bearing plate | 132 |
| Locking pawl | 133 |
| Disk cam | 134 |
| Cup disk | 135 |
| Actuating mandrel | 136 |
| Peg | 137 |
| Leaf spring | 138 |
| Control contour | 139 |
| Slot | 140 |
| Balls | 141 |
| Clamping pockets | 142 |
| Channel | 143 |
| Balls | 144 |
| Grooves | 145 |
| Disk spring | 146 |
| Metal bellows | 147 |
| Cone clutch | 149 |
| Multiple disk clutch | 151 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake cylinder for a pneumatically actuated vehicle brake, comprising:
    a spring force accumulator brake section for carrying out parking brake operations via a spring force accumulator spring, and a service brake section for carrying out service brake operations which are actuated by compressed air, the spring force accumulator brake section and the service brake section being combined in a housing to form one structural unit;
    a first piston dividing the housing into two spaces, of which one of the two spaces serves as a pressure space for actuating the service brake section, the spring force accumulator spring of the spring force accumulator section being arranged in the other space on an opposite side of the piston;
    a pneumatically actuable locking mechanism, the spring force accumulator spring acting in the space on a further spring force accumulator piston which is lockable with respect to the first piston by the locking mechanism, and is first releaseable by a release action of the locking mechanism, the spring force accumulator piston being connected directly or via further elements to a piston rod for actuating the vehicle brake;
    wherein, after release of the locking mechanism, the spring force accumulator spring acts between the two pistons and displaces them relative to one another in the case of a parking brake operation; and
    wherein the pneumatically actuable locking mechanism is operatively configured as a pneumatically actuable friction cone clutch, the cone clutch comprising balls as transmission elements within the clutch, said balls acting as clamping balls.

2. The brake cylinder as claimed in claim 1, wherein the spring force accumulator piston, which is loaded by the spring force accumulator spring, is in engagement with a threaded spindle operatively connected to the clutch;
    wherein the threaded spindle is secured against rotation in a release state of the brake cylinder, and the threaded spindle is capable of rotation as a result of reduction or cancelation of the engagement of the clutch, whereby the spring force accumulator piston is moveable in a longitudinal direction of the threaded spindle by relieving the spring force accumulator spring.

3. The brake cylinder as claimed in claim 1, wherein the balls which act as clamping balls lie in one clutch half in clamping pockets configured such that the balls can roll in the axial direction in an unimpeded manner, but do not move in the tangential direction.

4. The brake cylinder as claimed in claim 1, wherein the balls which act as clamping balls are pressed in the other clutch half into a circumferential channel adapted to the ball diameter in order to generate a friction which is decisive for the clutch force.

* * * * *